US012627188B2

(12) United States Patent
Swales et al.

(10) Patent No.: US 12,627,188 B2
(45) Date of Patent: May 12, 2026

(54) ELECTRIC MOTOR ROTOR WITH CIRCULATED AIR COOLING

(71) Applicant: GM GLOBAL TECHNOLOGY OPERATIONS LLC, Detroit, MI (US)

(72) Inventors: Shawn H. Swales, Canton, MI (US); Rebecca K. Risko Cattell, Royal Oak, MI (US); Neal Parsons, Novi, MI (US); Edward L. Kaiser, Orion, MI (US); Matthew James Bozich, Warren, MI (US); Nicholas Mark Sulimirski, Livonia, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 249 days.

(21) Appl. No.: 18/486,614

(22) Filed: Oct. 13, 2023

(65) Prior Publication Data

US 2025/0125676 A1 Apr. 17, 2025

(51) Int. Cl.
| | |
|---|---|
| *H02K 1/32* | (2006.01) |
| *H02K 1/276* | (2022.01) |

(52) U.S. Cl.
CPC ............. *H02K 1/32* (2013.01); *H02K 1/276* (2013.01)

(58) Field of Classification Search
CPC H02K 9/19; H02K 1/276; H02K 1/20; H02K 1/32
USPC ........................................................ 310/61
See application file for complete search history.

(56) References Cited

U.S. PATENT DOCUMENTS

| | | | | |
|---|---|---|---|---|
| 7,411,323 B2 * | 8/2008 | Pfannschmidt | .......... | H02K 1/32 310/58 |
| 9,954,419 B2 * | 4/2018 | Kitta | ......................... | H02K 9/19 |
| 10,587,170 B2 * | 3/2020 | Ribarov | ................... | H02K 9/19 |
| 11,133,724 B2 | 9/2021 | Lahr et al. | | |
| 11,277,056 B2 * | 3/2022 | Chernogorski | ...... | H02K 17/168 |
| 11,398,757 B2 * | 7/2022 | Sawata | ..................... | H02K 1/32 |
| 2007/0024129 A1 * | 2/2007 | Pfannschmidt | .......... | H02K 1/20 310/59 |
| 2007/0063594 A1 * | 3/2007 | Huynh | ..................... | H02K 9/00 310/59 |
| 2010/0289386 A1 * | 11/2010 | Gerstler | ................... | H02K 1/32 310/60 A |
| 2013/0171923 A1 * | 7/2013 | Li | ........................... | H02K 1/32 454/284 |
| 2014/0265657 A1 * | 9/2014 | Raczek | ..................... | H02K 9/19 310/54 |
| 2015/0280525 A1 * | 10/2015 | Rippel | ..................... | H02K 9/24 310/54 |

(Continued)

FOREIGN PATENT DOCUMENTS

| | | | |
|---|---|---|---|
| CN | 205429914 U | 8/2016 | |
| CN | 113519107 A * | 10/2021 | ............... H02K 9/19 |

(Continued)

*Primary Examiner* — Alex W Mok
(74) *Attorney, Agent, or Firm* — Ingrassia Fisher & Lorenz, LLP I IF&L

(57) ABSTRACT

A rotor for an electric machine includes an air circulation cooling system. The rotor includes a rotor core having cavities internal to the rotor core. The rotor core extends longitudinally between two ends. The cavities are defined by the rotor core. The cavities extend through the rotor core and open through at least one of the ends. The rotor core operates to circulate air through the cavities by rotation of the rotor core.

20 Claims, 5 Drawing Sheets

(56)        References Cited

U.S. PATENT DOCUMENTS

| 2020/0204021 | A1 * | 6/2020 | Kim | .......................... | H02K 9/19 |
| 2020/0244123 | A1 * | 7/2020 | Kang | ........................ | H02K 9/19 |
| 2021/0083555 | A1 * | 3/2021 | Lahr | ......................... | H02K 1/32 |
| 2021/0135533 | A1 * | 5/2021 | Samie | ..................... | H02K 1/276 |
| 2021/0305876 | A1 * | 9/2021 | Vanhee | .................... | H02K 9/19 |
| 2022/0140669 | A1 * | 5/2022 | Austin | ..................... | H02K 1/20 |
| | | | | | 310/54 |
| 2022/0360146 | A1 * | 11/2022 | Matschas | ................. | B60K 6/48 |
| 2023/0216379 | A1 | 7/2023 | Fatemi et al. | | |

FOREIGN PATENT DOCUMENTS

| DE | 102008064498 | A1 | | 7/2010 | | |
| DE | 102021101937 | A1 | | 7/2022 | | |
| DE | 102021212248 | A1 | | 5/2023 | | |
| EP | 3672035 | B1 | * | 2/2022 | .............. | H02K 9/19 |
| KR | 102018229 | B1 | * | 9/2019 | .............. | H02K 1/32 |
| KR | 20200076391 | A | * | 6/2020 | ............. | B60K 11/02 |

* cited by examiner

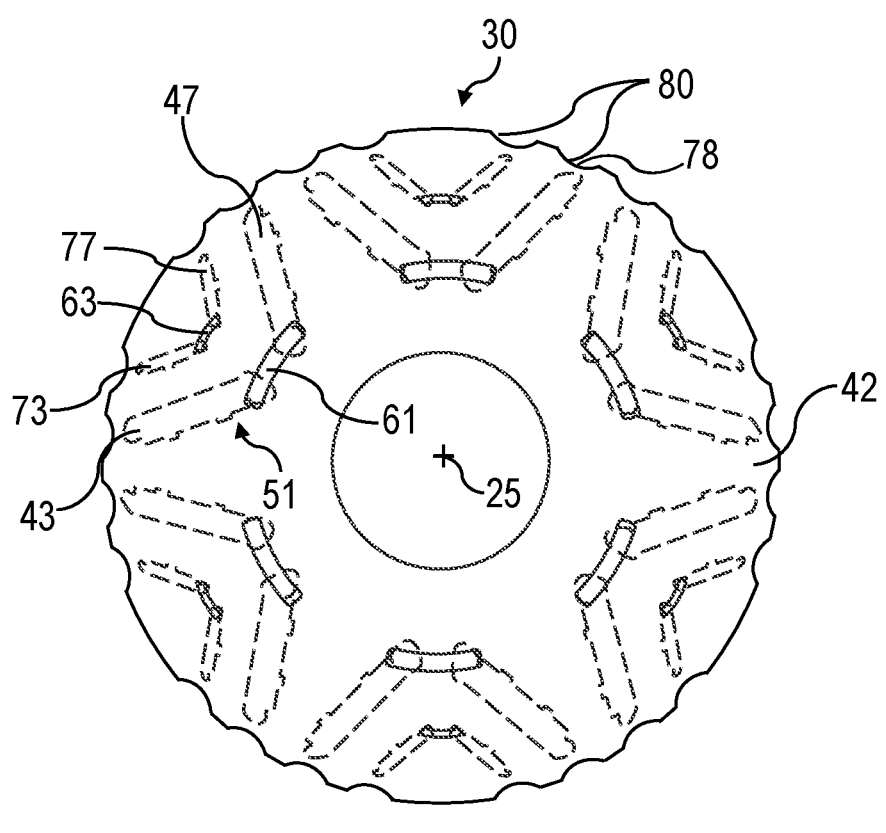
FIG. 5
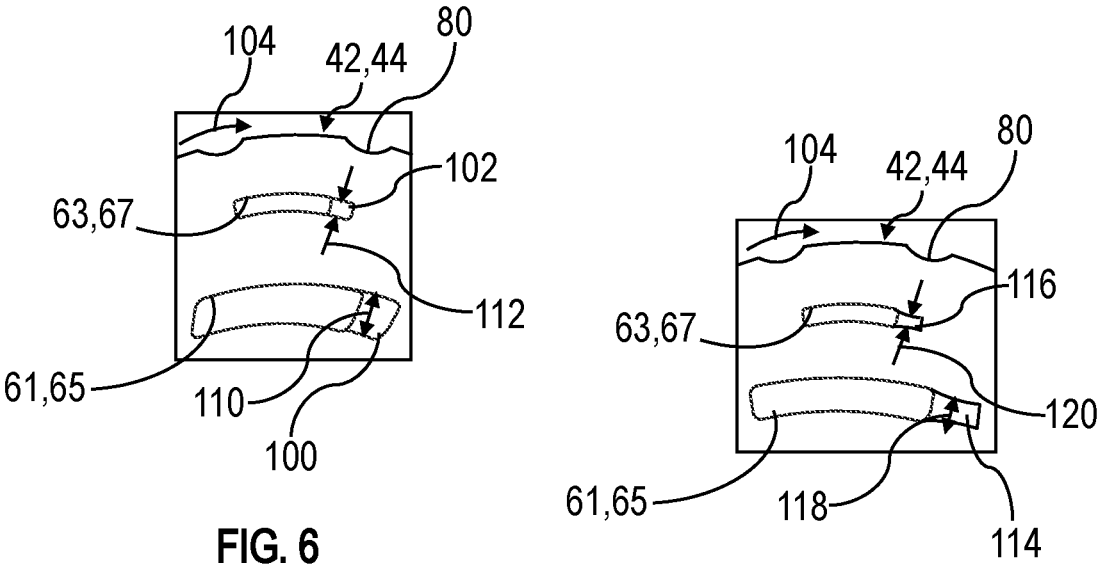
FIG. 6
FIG. 7

ELECTRIC MOTOR ROTOR WITH CIRCULATED AIR COOLING

INTRODUCTION

The present invention relates to electric machines and rotors thereof, and more particularly relates to a rotor system with internal cavities which may be employed to remove heat from the rotor's core and surrounding components.

A rotor, such as for an interior permanent magnet (IPM) machine or a synchronous reluctance (SR) machine, includes a rotor core assembled around a rotating shaft to spin within a stator. These rotors may have a segmental construction that includes a number of stacked laminations forming a core body. The core body may include internal openings at least some of which act as flux barriers to influence operational characteristics of the machine. The laminations of the core body are formed in a disc shape with a center opening for assembly on the rotation shaft. The flux barriers are distributed around the shaft opening. The laminations may be magnets/magnetic. The flux barrier openings may or may not contain magnets or conductors/coils.

Cooling of electric motors may be desirable because temperature rises may affect motor performance and component longevity. In addition, motor efficiency may decrease as temperature increases. Therefore, an optimal cooling system design to improve thermal management may increase the longevity, performance, and reliability of the motor. For example, rotor losses may result in heat generation inside the rotor. Removing the heat from the motor to avoid high operating temperatures is desirable.

Cooling liquid, such as oil, may be used to remove heat. Because the stator does not rotate, supplying cooling liquid does not add friction. If liquid is supplied around a rotor, spin losses would be incurred as friction is created when the rotor spins through the oil. In applications such as electric vehicles, added heat associated efficiency reductions and friction/spin losses lead to a lower driving range for the vehicle before charging of the battery is required.

It would be desirable to supply efficient cooling to the rotor of an electric motor while minimizing the drawbacks of friction loss. It would also be desirable to maximize the driving range of an electric vehicle. Accordingly, it is desirable to provide systems for electric machines that achieve high performance with efficient cooling. Furthermore, other desirable features and characteristics of the present invention will become apparent from the subsequent detailed description and the appended claims, taken in conjunction with the accompanying drawings and the foregoing technical field and background.

SUMMARY

In various embodiments, a rotor system has an air circulation cooling system for an electric machine. The rotor system includes a shaft that rotates about an axis. A rotor core has a cavity internal to the rotor core and is disposed on the shaft. The rotor core extends along the axis between two ends. The cavity extends through the rotor core and opens through at least one of the ends. The rotor core operates to circulate an air flow through the cavity by rotation of the rotor core.

In additional embodiments, the rotor core includes a lamination stack disposed between two end rings. At least one end ring includes an entry opening that registers with the cavity.

In additional embodiments, the rotor core includes a lamination stack disposed between two end rings. At least one end ring includes an entry opening that registers with the cavity and includes a ramp registering with the entry opening to induce air flow into the cavity.

In additional embodiments, the rotor core includes a lamination stack disposed between two end rings. The cavity extends completely through the lamination stack. One end ring includes an entry opening that registers with the cavity and the other end ring includes an exit opening that registers with the cavity.

In additional embodiments, a stator is disposed around the rotor core with an air gap defined between the rotor and the stator. The rotor core includes an outer perimeter with at least one groove facing into the air gap. The air flow circulates through the entry opening, the cavity, the exit opening and the groove in a circuit.

In additional embodiments, the rotor core includes a lamination stack with a blocking plate disposed in the lamination stack. End rings are disposed at the ends of the lamination stack. An entry opening is defined through one end ring and another entry opening is defined through the other end ring. One air circuit is defined on one side of the blocking plate and a second air circuit is defined on another side of the blocking plate.

In additional embodiments, the rotor core includes an outer perimeter with a groove. One air circuit flows the air in one direction through the groove and the other air circuit flows the air in an opposite direction through the groove.

In additional embodiments, a lamination stack is included in the rotor core with end rings on opposite ends of the lamination stack. One opening is defined through one end ring and another opening is defined through the other end ring. The end rings are identical and the one opening induces air flow into the rotor core and the other opening educes air flow out of the rotor core.

In additional embodiments, end rings are disposed at longitudinal ends of the rotor core. A cavity extends radially outward within the rotor core to a radially outward end disposed approximately at an outer perimeter of the rotor core. One end ring has an outer diameter defining a passage aligned with the radially outward end to allow air to flow along the rotor core adjacent the radially outward end.

In additional embodiments, an oil circuit provides cooling of the electric machine by a liquid. An air gap is defined between a stator and the rotor core. The rotor core includes grooves to recirculate the air flow in an air circuit around the rotor core, which inhibits the liquid from entering the air gap.

In a number of other embodiments, a rotor system for an electric machine has an air circulation cooling system. The rotor system includes a shaft that rotates about an axis. Cavities are formed internal to the rotor core, which is disposed on the shaft and extends along the axis. The cavities extend through the rotor core and open through at least one of its ends. The rotor core circulates an air flow through the cavities by rotation of the rotor core.

In additional embodiments, the rotor core includes a lamination stack disposed between end rings. Each end ring includes openings that register with the cavities.

In additional embodiments, the rotor core includes a lamination stack disposed between end rings. At least one of the end rings includes entry openings that register with the cavities and includes ramps registering with the entry openings. The ramps induce air flow into the cavities.

In additional embodiments, the rotor core includes a lamination stack disposed between end rings. The cavities extend completely through the lamination stack. One end ring includes entry openings that register with the cavities and the other end ring includes exit openings that register with the cavities.

In additional embodiments, a stator is disposed around the rotor core with an air gap defined between the rotor and the stator. The rotor core includes an outer perimeter with at least one groove facing into the air gap. The air flow circulates through the entry openings, the cavities, the exit openings and the groove in a circuit.

In additional embodiments, the rotor core includes a lamination stack. A blocking plate is disposed in the lamination stack of the rotor core. End rings are disposed at ends of the lamination stack. Entry openings are defined through both end rings. An air circuit is defined on one side of the blocking plate and another air circuit is defined on the opposite side of the blocking plate.

In additional embodiments, the rotor core includes an outer perimeter with at least one groove. One air circuit flows the air in one direction through the groove and the other air circuit flows the air in the opposite direction through the groove.

In additional embodiments, a lamination stack is included in the rotor core with end rings disposed at ends of the lamination stack. Openings are defined through the end rings. The end rings are identical with the openings in one end ring inducing air flow into the rotor core and the opening in the other end ring educing air flow out of the rotor core.

In additional embodiments, the end rings are disposed at longitudinal ends of the rotor core. The cavities may extend radially outward within the rotor core to radially outward ends disposed approximately at an outer perimeter of the rotor core. One end ring has an outer diameter defining passages aligned with at least some of the cavities at the radially outward ends to allow air to flow along the rotor core adjacent the radially outward ends.

In a number of additional embodiments, a rotor system for an electric machine of a vehicle includes an air circulation cooling system. A shaft rotates about an axis. A rotor core has internal cavities and is disposed on the shaft. A stator is disposed around the rotor core with an air gap defined between the stator and the rotor core. The cavities extend through the rotor core and open through at least one of the ends of the rotor core. The rotor core circulates an air flow through the cavities and through the air gap by rotation of the rotor core.

DESCRIPTION OF THE DRAWINGS

The exemplary embodiments will hereinafter be described in conjunction with the following drawing figures, wherein like numerals denote like elements, and wherein:

FIG. 5 is a schematic end view of part of the rotor of FIGS. 1 and 2 with air flow features, in accordance with various embodiments;

FIG. 6 is a schematic, fragmentary, end view of part of the rotor of FIGS. 1 and 2 with alternative air flow features, in accordance with various embodiments; and FIG. 7 is a schematic, fragmentary, end view of part of the rotor of FIGS. 1 and 2 with air flow features in the end ring, in accordance with various embodiments.

DETAILED DESCRIPTION

The following detailed description is merely exemplary in nature and is not intended to limit the application and uses. Furthermore, there is no intention to be bound by any expressed or implied theory presented in the preceding introduction, brief summary, or the following detailed description.

Figure 1:
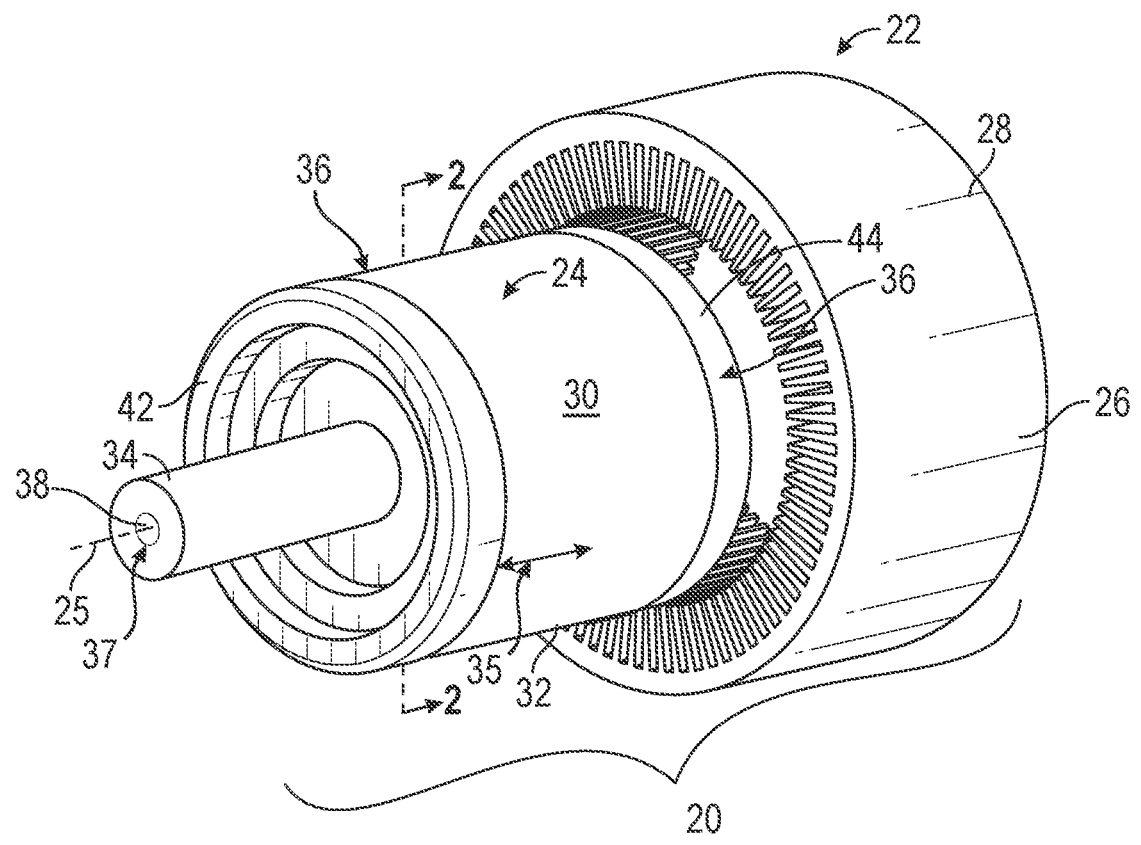
FIG. 1 is a schematic illustration of parts of an electric machine, in accordance with various embodiments.

Referring to FIG. 1, schematically illustrated are select components of an electric machine 20 including a stator assembly 22, and a rotor assembly 24 that is configured to rotate about an axis 25 through interaction with the stator assembly 22. In the illustration, the rotor assembly 24 is shown moved outside the stator assembly 22 for visibility. In this embodiment, the electric machine 20 is configured as a motor in which the current in the rotor assembly 24 that produces torque is induced from the magnetic field created by energization of the stator assembly 22. In a number of embodiments, the electric machine 20 is an alternating current machine suitable for use in applications requiring regulated speed control such as for a vehicle traction motor, although this disclosure is not limited to those applications.

The stator assembly 22 is a generally annular shaped component, which may be constructed for single-phase power or multiple phase power such as, three-phase. In this embodiment, the stator assembly 22 includes a core 26 made of a lamination stack 28. The lamination stack 28 may be formed by stampings that are slotted to receive windings (not shown) and are made of a soft magnetic material such as silicon steel. The windings may be coiled wire that extends through the slots of the core 26 of the stator assembly 22. The individual laminations in the lamination stack 28 may be insulated from one another by a thin non-conductive coating. In other embodiments, another ferromagnetic material may be used to construct the lamination stack 28. The stator assembly 22 may include the aforementioned windings for energization. Energization of the windings may be controlled to generate a rotating magnetic field.

The rotor assembly 24 includes a core 30 which includes a lamination stack 32 and is configured to receive a shaft 34. The laminations in the lamination stack 32 may be stamped or otherwise formed and are made of a ferromagnetic material and may be insulated from one another by a thin non-conductive coating or may be made of another material. End rings 42, 44 are formed at the ends of the lamination stack 32 and may be a part of the core 30. The end rings 42, 44 may help contain the lamination stack 32 on the shaft 34 and provide support therefor. In the current embodiment, the end rings 42, 44 are fabricated of an aluminum material for light weight and to provide structural integrity. One or both of the end rings 42, 44 may provide a number of functions including operating as air flow inducers/inductors/directors in a cooling system 36, which is described in more detail below.

The rotor assembly 24 may be made of permanent magnets or may include conductors to generate its magnetic field. The rotor assembly 24 is configured with a number of poles to create the magnetic circuit of the rotor assembly 24, which uses the angular position of the rotor assembly 24 for interacting with the field induced by the stator assembly 22 of the electric machine 20. These poles may be created, at least in-part, by flux barriers as described below. The rotor's magnetic field may be generated by a magnetic element source such as permanent magnets or electrical conductors/coils.

Figure 2:
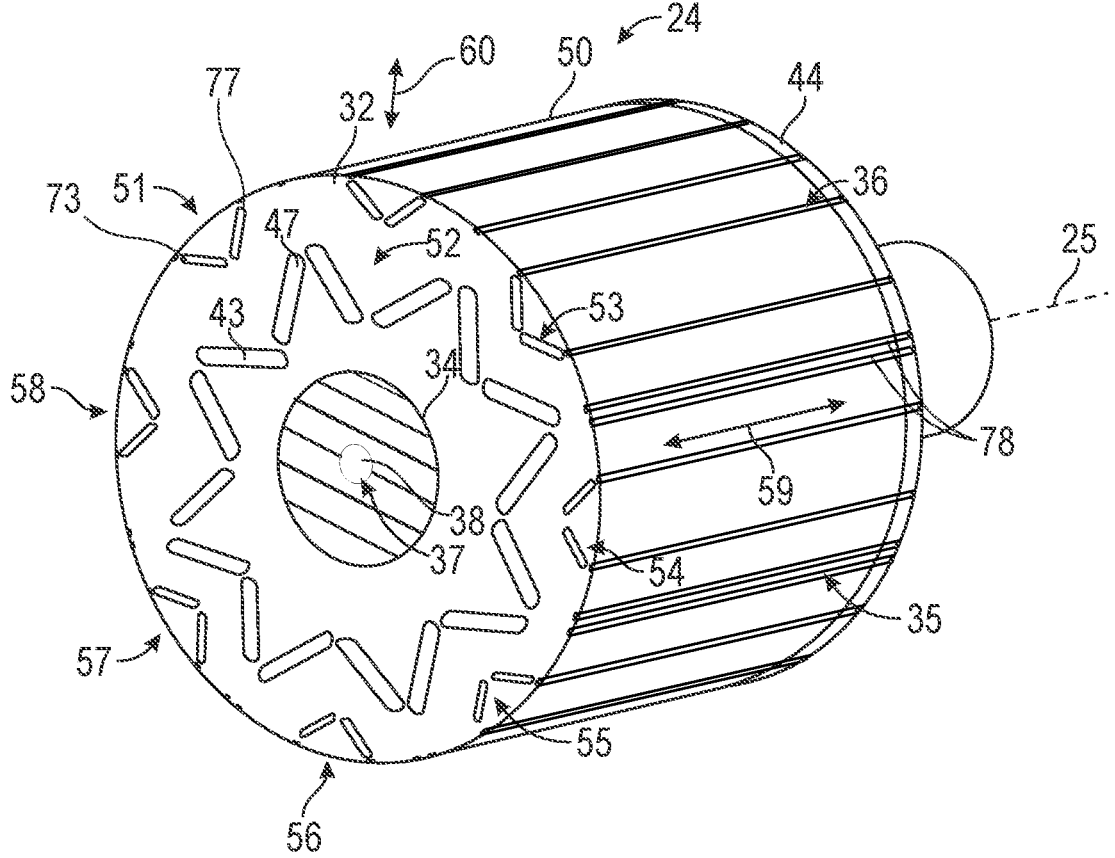
FIG. 2 is a fragmentary, perspective, sectioned illustration of the rotor taken generally along the line 2-2 on the electric machine of FIG. 1, in accordance with various embodiments.

In FIG. 2, the rotor assembly 24 is shown sectioned with a side 48 of one of the laminations of the lamination stack 32 exposed and visible. Each lamination in the lamination stack 32 includes a number of slot-like openings, referred to as cavities, that may serve multiple purposes. Distributed around the rotor assembly 24 between the shaft 34 its outer perimeter 50 are eight cavity groups 51-58, each formed in two angled layers spaced in the radial direction 60. The cavity groups 51-58 are formed as openings in the stacked laminations of the lamination stack 32. The cavities in the cavity groups 51-58 extend through the rotor lamination stack 32 of the core 30 in an axial direction 59, which is parallel to the axis 25. The cavity groups 51-58 operate as barriers to magnetic flux and help define the magnetic poles of the rotor assembly 24. Some or all of the cavities in the cavity groups 51-58 may contain magnetic element sources. In the current embodiment, the rotor assembly 24 has eight poles defined by the cavity groups 51-58. The rotor assembly 24 may also include additional layers of openings that may serve particular functions in the magnetic design or other aspects of the rotor assembly 24.

Use of air in the cooling system 36 through an air circuit 35 enables utilizing the cavities of the cavity groups 51-58 of the core 30 as cooling conduits. In a number of embodiments some or all cavities in both layers of the cavity groups 51-58 may be employed as part of the air circuit. In a number of embodiments, the cooling system 36 may also include a liquid circuit 37, which may employ pumped oil as the liquid, which may enter the rotor assembly 24 through an opening 38 in the shaft 34.

Figure 3:
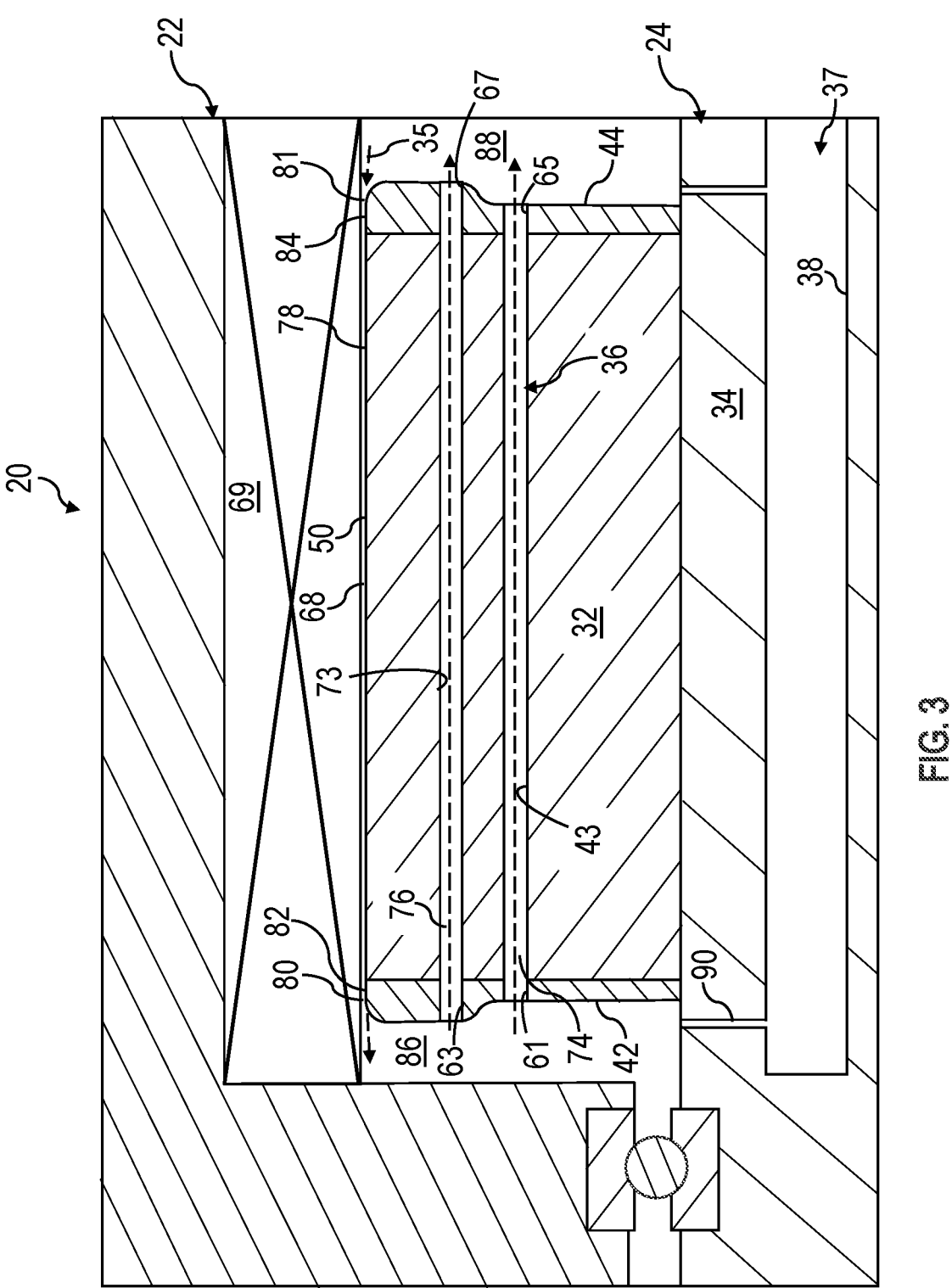
FIG. 3 is a schematic, sectional illustration of part of the electric machine of FIGS. 1 and 2 showing the rotor area, in accordance with various embodiments.

Referring to FIG. 3, an area of the electric machine 20 is illustrated showing aspects of the cooling system 36, including the air circuit 35 and the liquid circuit 37. Shown is the rotor assembly 24 with the shaft 34, the lamination stack 32 and the end rings 42, 44. Also shown is the stator assembly 22. An air gap 68 exists between the outer perimeter 50 of the rotor assembly 24 and the stator assembly 22, with windings 69. The air gap 68 is optimized in size to ensure free rotation of the rotor assembly 24 while minimizing magnetic losses. In general, the cooling system 36 includes the air circuit 35 and, as shown includes the liquid circuit 37. In some embodiments, the liquid circuit 37 may be omitted. The air circuit 35 extends through the rotor core 30 and the air gap 68. The liquid circuit 37 extends through the shaft 34, along the outside of one or both of the end rings 42, 44, and around the area of the stator assembly 22.

Referring again to FIG. 2, as shown each of the cavity groups 51-58 is similar and the details of cavity group 51 will be described with the understanding that the other cavity groups 52-58 include like elements. The cavity group 51 includes two layers of flux barriers, which in the current embodiment of an IPM motor are referred to as the cavities. The radially outward layer includes cavities 73, 77 and the radially inner layer includes the cavities 43, 47. The cavities 43, 47, 73, 77 define structural features of the remaining material/steel of the laminations of the lamination stack 32 in the form of struts and bridges, define magnetic characteristics of rotor core 30, and provide longitudinal openings through the lamination stack 32. As shown in FIG. 3, the cavity 43 corresponds to the opening 74 and the cavity 73 corresponds to the opening 76. The openings 74, 76 each extend completely through the lamination stack 32 to the end rings 42, 44. It should be understood that each of the other cavities in the cavity groups 51-58 also extends through the lamination stack 32 in the longitudinal direction (parallel to the axis 25).

The rotor assembly 24 also includes longitudinal features shown in FIGS. 2 and 3 in the form of grooves 78 in the outer perimeter 50 of the rotor assembly 24 (specifically of the lamination stack 32) and passages 80, 81 that may be scallop shaped in the outer perimeters 82, 84 of the end rings 42, 44, respectively. The passages 80 are also shown in FIG. 5, with the passages 81 being similar. As shown in FIG. 3, the end ring 42 has entries 61, 63 that extend through the end ring 42 and register/open to the openings 74, 76, respectively. The end ring 44 has exits 65, 67 that extend through the end ring 44 and register/open to the openings 74, 76, respectively. The rotor assembly 24 and/or the core 30 is configured so that during rotation air is circulated from a void 86 outside the end ring 42 through the entries 61, 63 in the end ring 42, through the openings 74, 76, through the exits 65, 67 in the end ring 44, through a void 88 outside the end ring 44 and is recirculated through the passage 81, the groove 78 and the passage 80 to the void 86. As such, a complete air circuit 35 is provided through the rotor assembly 24. It will be appreciated that any or all of the cavities of the cavity groups 51-58 may be employed in the air circuit 35.

In this embodiment, the electric machine 20 also includes the liquid circuit 37. The liquid circuit 37 includes a remote sump and a pump (both not shown) that supply liquid through the opening 38 in the shaft 34 and a bore 90 into the void 86 to cool the stator assembly 22, especially at its end windings. Due to rotation of the rotor assembly 24, the liquid is thrown radially outward. To resist flow of the oil from the liquid circuit 37 into the air gap 68, the air circuit 35 returns air through the grooves 78 into the void 86, inhibiting oil/liquid entry into the air gap 68.

Figure 4:
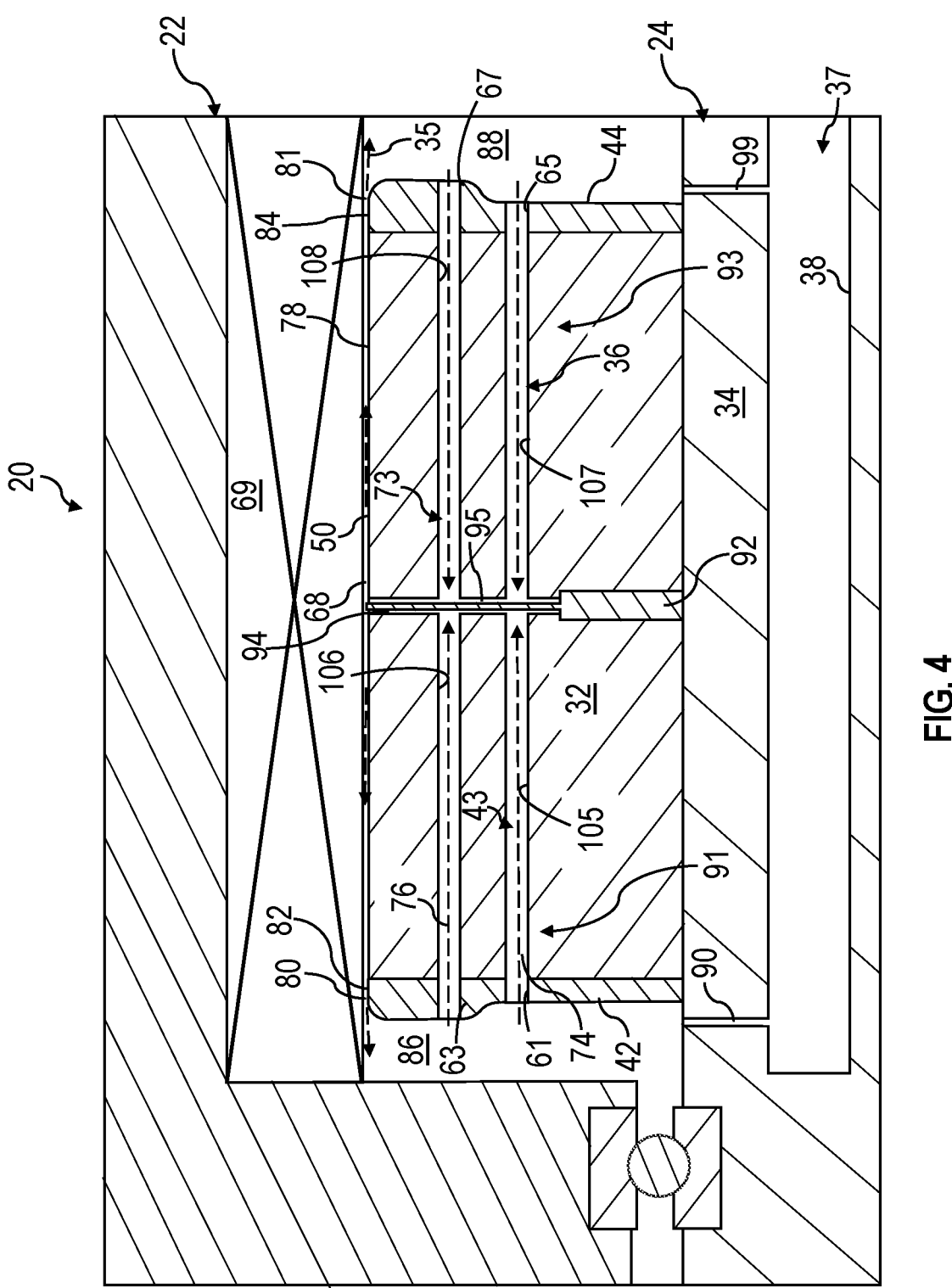
FIG. 4 is a schematic, alternative, sectional illustration of part of the electric machine of FIGS. 1 and 2 showing the rotor area, in accordance with various embodiments.

Referring to FIG. 4, an area of the electric machine 20 is illustrated showing aspects of an alternative version of the cooling system 36. Shown is the rotor assembly 24 with the shaft 34, the lamination stack 32 and the end rings 42, 44. Also shown is the stator assembly 22. The air gap 68 exists between the outer perimeter 50 of the rotor assembly 24 and the stator assembly 22. In general, the cooling system 36 includes the air circuit 35 and, as shown includes the liquid circuit 37. The air circuit 35 extends through the rotor core 30 and the air gap 68. The liquid circuit 37 extends through the shaft 34, along the outside of both end rings 42, 44, and around the area of the stator assembly 22. In some embodiments, the liquid circuit 37 may not be included.

In this alternative version of FIG. 4, a blocking plate 92 is included in the lamination stack 32. The blocking plate 92 is configured to separate the air circuit 35 into two branches 91 and 93. The branch 91 draws air into the rotor core 30 from the void 86 through passages 105, 106 formed by cavities (e.g. 43, 73), and returns that air to the void 86, The branch 93 draws air into the rotor core 30 from the void 88 through passages 107, 108 formed by cavities (e.g. 43, 73), and returns that air to the void 88. The blocking plate 92 defines radial passages 94, 95 and separates the branches 91, 93. The blocking plate 92 includes an outer perimeter 96 that does not include a feature corresponding to the groove 78 so that movement of air across its outer perimeter 96 is not facilitated. In other words, the direction of air flow is split at the blocking plate 92 to be directed longitudinally outward at the outer perimeter 50 in opposite directions from the radial passages 94, 95.

More specifically, in the branch 91, air from the void 86 is drawn through the entries 61, 63 in the end ring 42, through the passages 105, 106, is directed through the radial passage 94 by the blocking plate 92, and is recirculated through air gap 68, the groove 78 and the passage 80 to the void 86. In the branch 93, air from the void 88 is drawn through the exits (entries in this embodiment) 65, 67 in the end ring 44, through the openings 75, 79, is directed through the radial passage 95 by the blocking plate 92, and is recirculated through the air gap 68, the groove 78 and the passage 82 to the void 88. As such, a complete air circuit 35 is provided through the rotor assembly 24 through two branches 91, 93. It will be appreciated that any or all of the cavities of the cavity groups 51-58 may be employed in the air circuit 35 in this embodiment.

Also in this embodiment, the electric machine 20 also includes the liquid circuit 37. The liquid circuit 37 includes a remote sump and a pump (both not shown) that supply liquid through the opening 38 in the shaft 34 and both the bore 90 into the void 86 and a bore 99 into the void 88 to cool the stator assembly 22. Due to rotation of the rotor assembly 24, the liquid is thrown radially outward. To resist flow of the liquid into the air gap 68, the air circuit 35 returns air into the void 86 and the void 88 inhibiting liquid entry into the air gap 68.

Referring to FIG. 5, the entries 61, 63 (and the exits 65, 67) align with the cavities of the cavity groups 51-58 to use both the inner and outer cavity sets in the cavity groups 51-58. In this embodiment, the entry 61 aligns and registers with the radially inner ends of the cavities 43, 47 and the entry 63 aligns and registers with the radially inner ends of the cavities 73, 77. The exits 65, 67 may be in-line with the entries 61, 63 or may be located further radially outward while still registering with the cavities.

As shown in FIG. 5, the end rings 42, 44, for example the end ring 42, may have the passages 80 (which are aligned with the grooves 78), positioned so that the grooves 78 are positioned directly outside the radially outer ends cavities 43, 47, 73, 77 of the cavity groups 51-58. The position is adjacent the ends of the cavities 43, 47, 73, 77 at the outer perimeter 50 of the core 30. In addition to allowing flow from the grooves 78 through the passages 80, this registering and positioning configuration directs air flow near the radially outward end of the cavities 73, 77 where heat may be concentrated.

Referring to FIG. 6, entry/exit features of the end rings 42, 44 are illustrated. The entry/exit 61, 65 includes a scoop feature in the form of a ramp 100. The ramp 100 is an elongated part of the entry/exit 61, 65 that extends in a circumferential direction around the axis of rotation to capture/expel air. The ramp 100 is formed as a depression in the respective end ring 42, 44 that forms a part of the entry/exit 61, 65 and that provides a sloping transition that slopes inward from the exterior surface of the end rind 42, 44 to the main opening of the entry/exit 61, 65 becoming deeper as it slopes. Similarly, the entry/exit 63, 67 includes a scoop feature in the form of an elongated and sloped ramp 102. The ramps 100, 102 may operate to induce flow into the rotor core 30 and/or to educe/draw flow out of the rotor core 30 depending on their orientation and the direction of rotation of the rotor assembly 24. For example, when the rotation of the rotor assembly 24 is in the direction 104 as viewed in FIG. 6, the ramps 100, 102 operate to scoop/induce air flow into the respective end ring 42, 44. In embodiments, the end rings 42, 44 are identical/interchangeable and the openings of the entry/exit 63, 67 are configured to induce air flow into the rotor core 30 on one end and to educe/draw air flow out of the rotor core 30 on the other end due to the direction of rotation and their orientation.

In the embodiment of FIG. 6, the ramps 100, 102 have radial dimensions 110, 112 that are similar in size to the radially directed size of the entry/exit 61, 65. This provides a selected amount of air flow consistent with the level of cooling needed. As shown in FIG. 7, ramps 114, 116 taper and have radial dimensions 118, 120 that are narrower in size to that of the entry/exit 61, 65. Otherwise, the ramps 114, 116 operate similar to the ramps 100, 102. The selected characteristics provide tuning of the air flow for the amount of cooling needed. In other embodiments, the ramps 100, 102 may have radial dimensions that are larger than those of the entry/exit 61, 65, such as being flared outward, to induce/educe a greater rate of air flow. The ramps 100, 102, 114, 116 operate to draw in air when they are oriented at the leading end of the entry 61 in the direction of rotation. The ramps 100, 102, 114, 116 operate to expel air when they are oriented at the trailing end of the exit 65 in the direction of rotation. It will be appreciated that if the direction of rotation of the rotor assembly 24 is opposite that of the direction 104 of FIG. 6, the ramps 100, 102 will have the effect of educing flow out of the rotor core 30.

Accordingly, the rotor of an electric machine includes a core that may be formed by a stack of laminations with inner cavities forming a housing for the source of the electromagnetic field, such as permanent magnets or electrical conductors. Part of the cavities in the proximity of the electromagnetic field source may be occupied by cavities, which extend through the length of the rotor and are through the rotor's end rings. The air circuit of the electric machine includes air flow through the cavities, the end rings, and through the air gap between the rotor and the stator. Oil flow in the electrical machine may also be employed for cooling. The air circuit may be designed to inhibit oil infiltration into the air gap. In addition, the end rings may include features to effect the desired air flow characteristics. Air intake/exit features are designed to be readily cast in the end rings. Speed/rotation of the rotor and its end rings promotes air to flow through the rotor core with air intake/exit features optimized to maximum air flow. Air cooling may be used in combination with oil cooling features on the end rings that direct oil from the center of the shaft to the end rings and then to the stator end windings, where oil is not directed through the rotor core.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A rotor system with an air circulation cooling system for an electric machine, the rotor system comprising:

a shaft configured to rotate about an axis;

a rotor core having a first axial end, a second axial end, a radially outer surface, and at least one cavity internal to the rotor core and passages in an outer perimeter of the rotor core at the radially outer surface, the rotor core disposed on the shaft and extending along the axis from the first axial end to the second axial end, with a first void defined as a first space axially adjacent to the first axial end and outside the rotor core and a second void defined as a second space axially adjacent to the second axial end and outside the rotor core, and a first end ring and a second end ring, wherein:

the rotor core includes laminations stacked together in a stack, the first end ring is disposed against a first end of the stack and the second end ring is disposed at a second end of the stack, the at least one cavity comprises a first cavity and a second cavity that extend axially through the laminations of the rotor core, the cavities are configured as flux barriers, the first cavity has a first radial end and a second radial end, wherein the first radial end is disposed radially inward from the second radial end, the second cavity has a third radial end and a fourth radial end, wherein the third radial end is disposed radially inward from the fourth radial end, and the first end ring includes an entry opening that registers with the first cavity at the first radial end and with the second cavity at the third radial end, the passages extend through an entirety of the rotor core in an axial direction from the first axial end to the second axial end, the at least one cavity extends through the rotor core and opens through at least one of the first axial end into the first void and the second axial end into the second void and the rotor core is configured to circulate an air flow through the at least one cavity by rotation of the rotor core, and an air circuit is defined through the at least one cavity of the rotor core, through the first void, through the passages, through the second void, and back into the at least one cavity, the air circuit defining a path through which the air flow circulates during rotation of the rotor core.

2. The rotor system of claim 1, wherein the passages comprise grooves that extend through the laminations and openings that are scallop shaped in both the first end ring and the second end ring, wherein the openings register with the grooves.

3. The rotor system of claim 1, wherein at least one of the first end ring and the second end ring includes a ramp registering with the entry opening, the ramp configured to induce the air flow into the at least one cavity.

4. The rotor system of claim 1, wherein:

the at least one cavity extends completely through the laminations, and the second end ring includes an exit opening that registers with the at least one cavity.

5. The rotor system of claim 4, comprising a stator disposed around the rotor core with an air gap defined between the rotor core and the stator, wherein a radial passage opens the cavities into the air gap.

6. The rotor system of claim 1, comprising a stator disposed around the rotor core with a gap defined between the stator and the rotor core, wherein the laminations of the rotor core comprise a lamination stack and comprising:

a blocking plate disposed in the lamination stack of the rotor core, the blocking plate extending from the shaft radially outward and continuously to the outer perimeter disposed in the gap between the rotor core and the stator; and wherein a first air circuit is defined on a first side of the blocking plate and a second air circuit is defined on a second side of the blocking plate, with the air flow split at the blocking plate and directed axially outward in the gap into two split flows in opposite directions from the blocking plate.

7. The rotor system of claim 6, wherein two complete air circuits are defined through the rotor core, wherein the two complete air circuits are directed through the gap axially in their entirety.

8. The rotor system of claim 1, comprising a first opening defined through the first end ring and a second opening defined through the second end ring, wherein:

the second opening defines an exit from the at least one cavity;

a first ramp is defined in the first end ring adjacent to and leading into the entry opening, and the first ramp slopes inward from an exterior surface of the first end ring;

a second ramp is defined in the second end ring adjacent to and leading out of the exit;

the entry opening has a first radial dimension and the first ramp has a second radial dimension, wherein the first radial dimension is approximately the same as the second radial dimension;

the exit has a third radial dimension and the second ramp has a fourth radial dimension, wherein the third radial dimension is approximately the same as the fourth radial dimension; and the first end ring is identical to the second end ring and the first opening is configured to induce the air flow into the rotor core and the second opening is configured to educe the air flow out of the rotor core.

9. The rotor system of claim 1, wherein the shaft includes a liquid opening and a bore that opens the liquid opening to at least one of the first void and the second void.

10. The rotor system of claim 1, comprising an oil circuit configured to provide cooling of the electric machine by a liquid and comprising a stator, with an air gap defined between the stator and the rotor core, wherein the rotor core includes grooves configured to recirculate the air flow in the air circuit around the rotor core, wherein the air flow is induced solely by rotation of the rotor core without an air pump, the air circuit configured to inhibit the liquid from entering the air gap.

11. A rotor system with an air circulation cooling system for an electric machine, the rotor system comprising:

a shaft configured to rotate about an axis;

a rotor core having a first axial end, a second axial end, a radially outer surface and a plurality of cavities internal to the rotor core and passages in an outer perimeter of the rotor core at the radially outer surface, the rotor core disposed on the shaft and extending along the axis from the first axial end to the second axial end with a first void defined as a first space axially adjacent to the first axial end and outside the rotor core and a second void defined as a second space axially adjacent to the second axial end and outside the rotor core, and a lamination stack in the rotor core with a first end ring on one end of the lamination stack and a second end ring on another end of the lamination stack, with a first opening defined through the first end ring and a second opening defined through the second end ring, wherein:

the first opening defines an entry into at least one cavity of the plurality of cavities;

the second opening defines an exit from the at least one cavity;

a first ramp is defined in the first end ring adjacent to and leading into the entry, and the first ramp slopes inward from an exterior surface of the first end ring;

a second ramp is defined in the second end ring adjacent to and leading out of the exit;

the entry has a first radial dimension and the first ramp has a second radial dimension, wherein the second radial dimension is narrower than the first radial dimension to tune an air flow into the entry;

the exit has a third radial dimension and the second ramp has a fourth radial dimension, wherein the fourth radial dimension is narrower than the third radial dimension to tune the air flow out of the exit; and the first end ring is identical to the second end ring and the first opening is configured to induce the air flow into the rotor core and the second opening is configured to educe the air flow out of the rotor core, the passages extend through an entirety of the rotor core in an axial direction from the first axial end to the second axial end, the plurality of cavities extend through the rotor core and open through at least one of the first axial end into the first void and the second axial end into the second void, the rotor core is configured to circulate the air flow through the plurality of cavities by rotation of the rotor core, and an air circuit is defined through the at least one cavity of the rotor core, through the first void, through the passages, through the second void, and back into the at least one cavity, the air circuit defining a path through which the air flow circulates during rotation of the rotor core.

12. The rotor system of claim 11, wherein each of the first end ring and the second end ring includes openings that register with the plurality of cavities, wherein the passages comprise grooves that extend through the lamination stack and openings that are scallop shaped in both the first end ring and the second end ring, wherein the openings register with the grooves.

13. The rotor system of claim 11, wherein the first end ring and the second end ring each include the entry as openings that register with the plurality of cavities, wherein at least one of the first end ring and the second end ring includes ramps registering with the openings, the ramps configured to induce the air flow into the plurality of cavities.

14. The rotor system of claim 11, wherein:

the plurality of cavities extend completely through the lamination stack, the first end ring includes the entry as openings that register with the plurality of cavities, and the second end ring includes exit openings that register with the plurality of cavities.

15. The rotor system of claim 14, comprising a stator disposed around the rotor core with an air gap defined between the rotor core and the stator, wherein a radial passage opens the cavities into the air gap.

16. The rotor system of claim 11, comprising a stator disposed around the rotor core with a gap defined between the stator and the rotor core, and comprising:

a blocking plate disposed in the lamination stack of the rotor core, the blocking plate extending from the shaft radially outward and continuously to the outer perimeter disposed in the gap between the rotor core and a stator;

the entry includes first entry openings defined through the first end ring and second entry openings defined through the second end ring, wherein a first air circuit is defined on a first side of the blocking plate and a second air circuit is defined on a second side of the blocking plate, with the air flow split at the blocking plate and directed axially outward in the gap into two split flows in opposite directions from the blocking plate.

17. The rotor system of claim 16, wherein two complete air circuits are defined through the rotor core, wherein the two complete air circuits are directed through the gap axially in their entirety.

18. The rotor system of claim 11, wherein the shaft includes a liquid opening and a bore that opens the liquid opening to at least one of the first void and the second void.

19. The rotor system of claim 11, wherein:

the first end ring is disposed against a first end of the stack and the second end ring is disposed at a second end of the stack, wherein the at least one cavity comprises a first cavity and a second cavity that extend axially through the lamination stack of the rotor core, the cavities are configured as flux barriers, the first cavity has a first radial end and a second radial end, wherein the first radial end is disposed radially inward from the second radial end, the second cavity has a third radial end and a fourth radial end, wherein the third radial end is disposed radially inward from the fourth radial end, and the first end ring includes the entry that registers with the first cavity at the first radial end and with the second cavity at the third radial end.

20. A rotor system with an air circulation cooling system for an electric machine of a vehicle, the rotor system comprising:

a shaft configured to rotate about an axis;

a rotor core having a first axial end, a second axial end, a radially outer surface and a plurality of cavities internal to the rotor core and passages in an outer perimeter of the rotor core at the radially outer surface, the rotor core disposed on the shaft and extending along the axis from the first axial end to the second axial end with a first void defined as a first space axially adjacent to the first axial end and outside the rotor core and a second void defined as a second space axially adjacent to the second axial end and outside the rotor core, wherein the passages extend through an entirety of the rotor core in an axial direction from the first axial end to the second axial end;

a stator disposed around the rotor core with an air gap defined between the stator and the rotor core, wherein the rotor core comprises a lamination stack;

a blocking plate disposed in the lamination stack of the rotor core, the blocking plate extending from the shaft radially outward and continuously to the outer perimeter disposed in the gap between the rotor core and the stator;

a first end ring on one end of the lamination stack; and a second end ring on another end of the lamination stack, with a first entry opening defined through the first end ring and a second entry opening defined through the second end ring, wherein a first air circuit is defined on a first side of the blocking plate and a second air circuit is defined on a second side of the blocking plate, with an air flow that is split at the blocking plate and directed axially outward in the air gap into two split flows in opposite directions from the blocking plate, wherein the plurality of cavities extend through the rotor core and open through at least one of the first axial end into the first void and the second axial end into the second void, wherein the rotor core is configured to circulate the air flow through the plurality of cavities and through the air gap by rotation of the rotor core, wherein at least one of the first air circuit and the second air circuit is defined through the at least one of the cavities of the rotor core, through the first void, through the passages, through the second void, and back into the at least one cavity, at least one of the first air circuit and the second air circuit defining a path through which the air flow circulates during rotation of the rotor core.

\* \* \* \* \*